C. W. VAN VLEET.
MATCH BOXING MACHINE.
APPLICATION FILED OCT. 21, 1908.
1,165,349.
Patented Dec. 21, 1915.
10 SHEETS—SHEET 6.
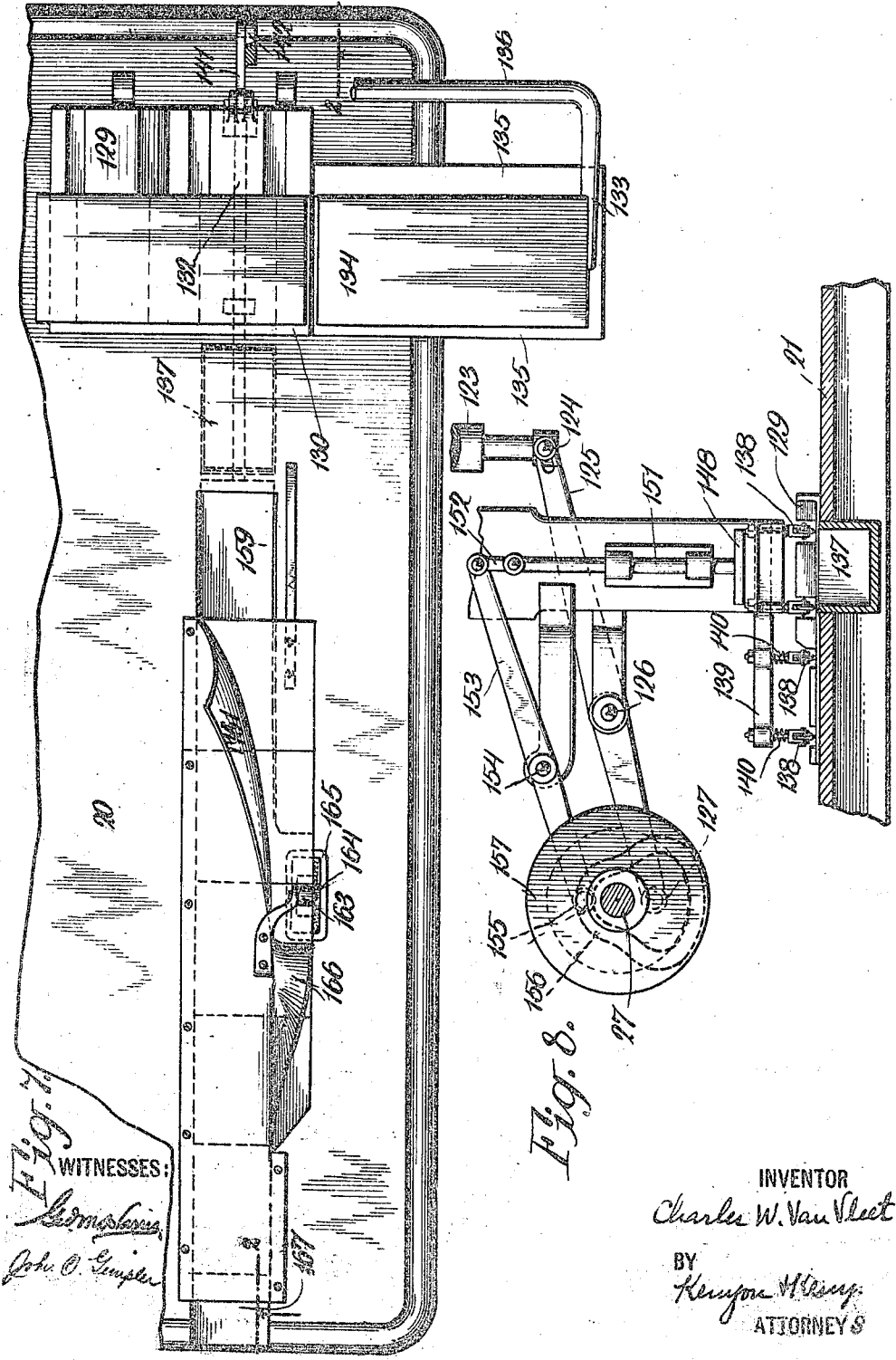
INVENTOR
Charles W. Van Vleet
BY
Kenyon & Kenyon
ATTORNEYS

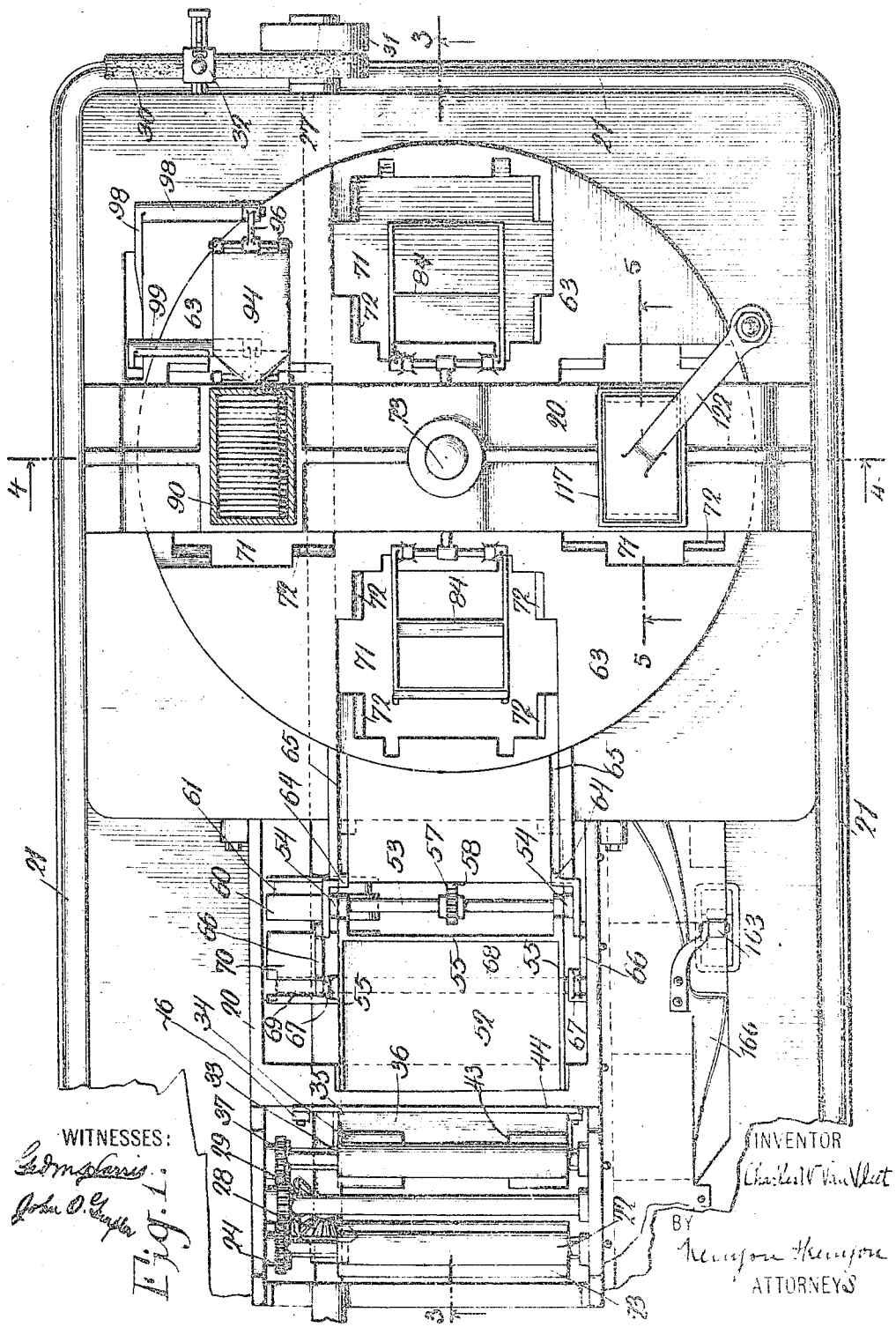

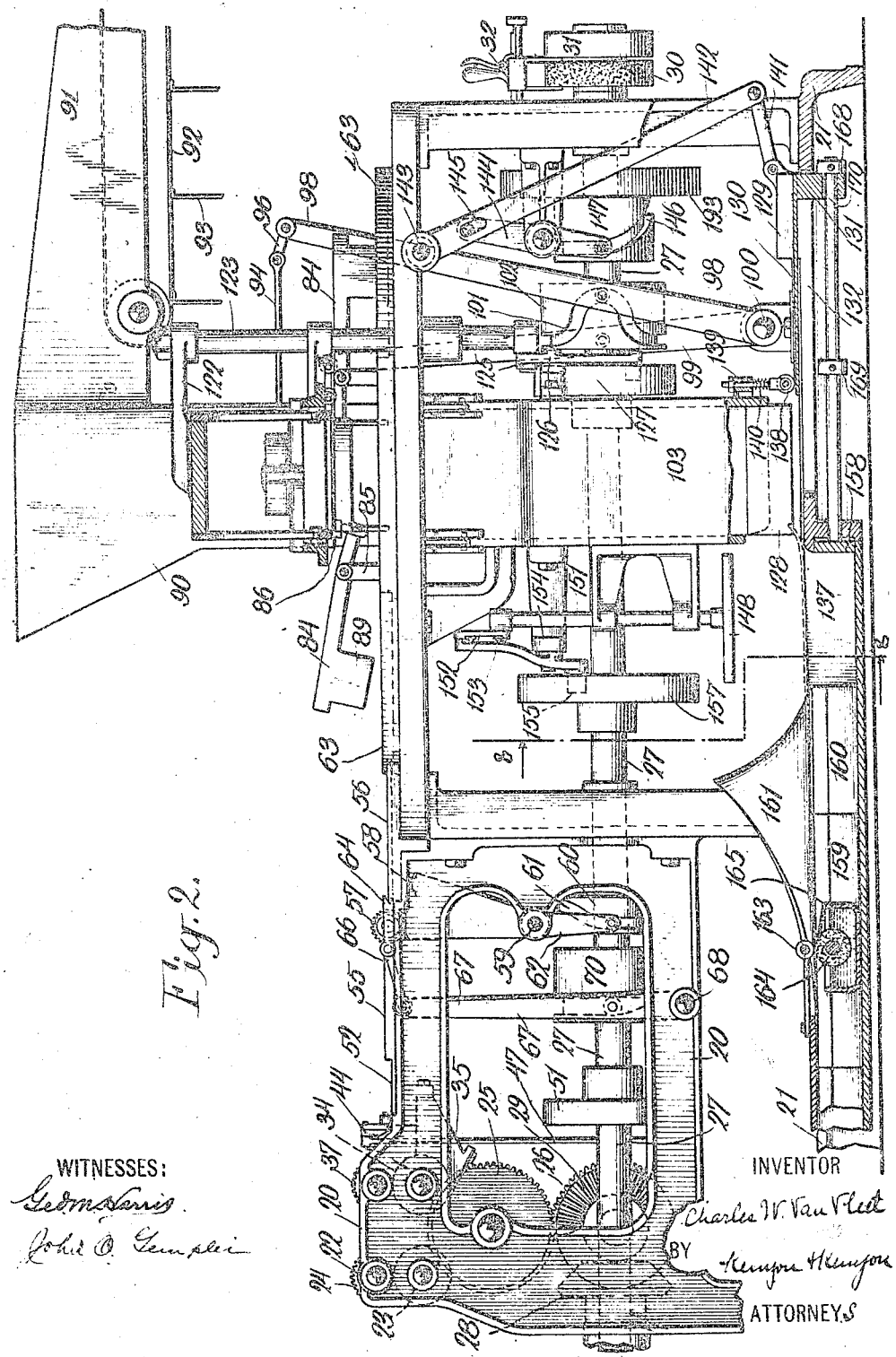

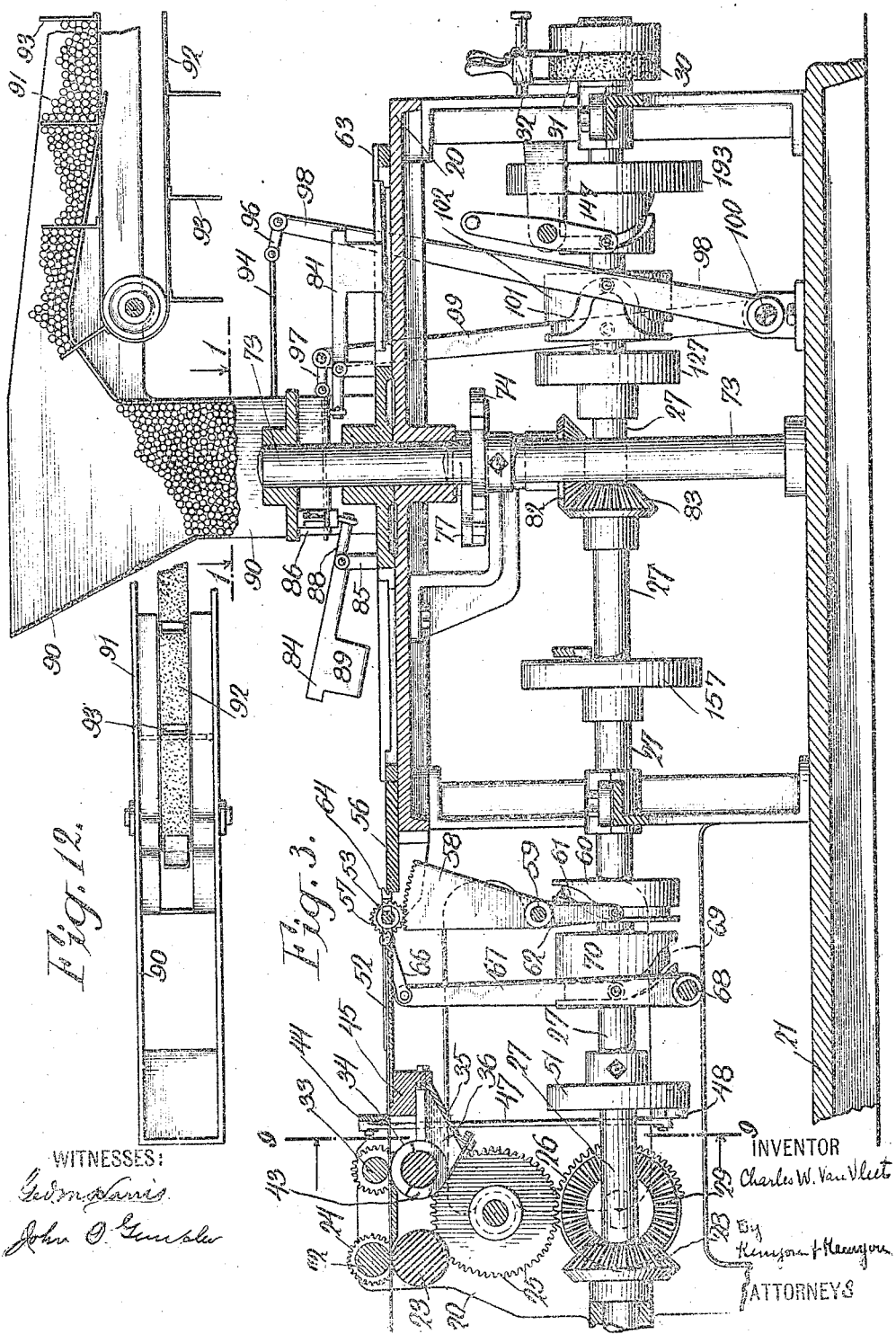

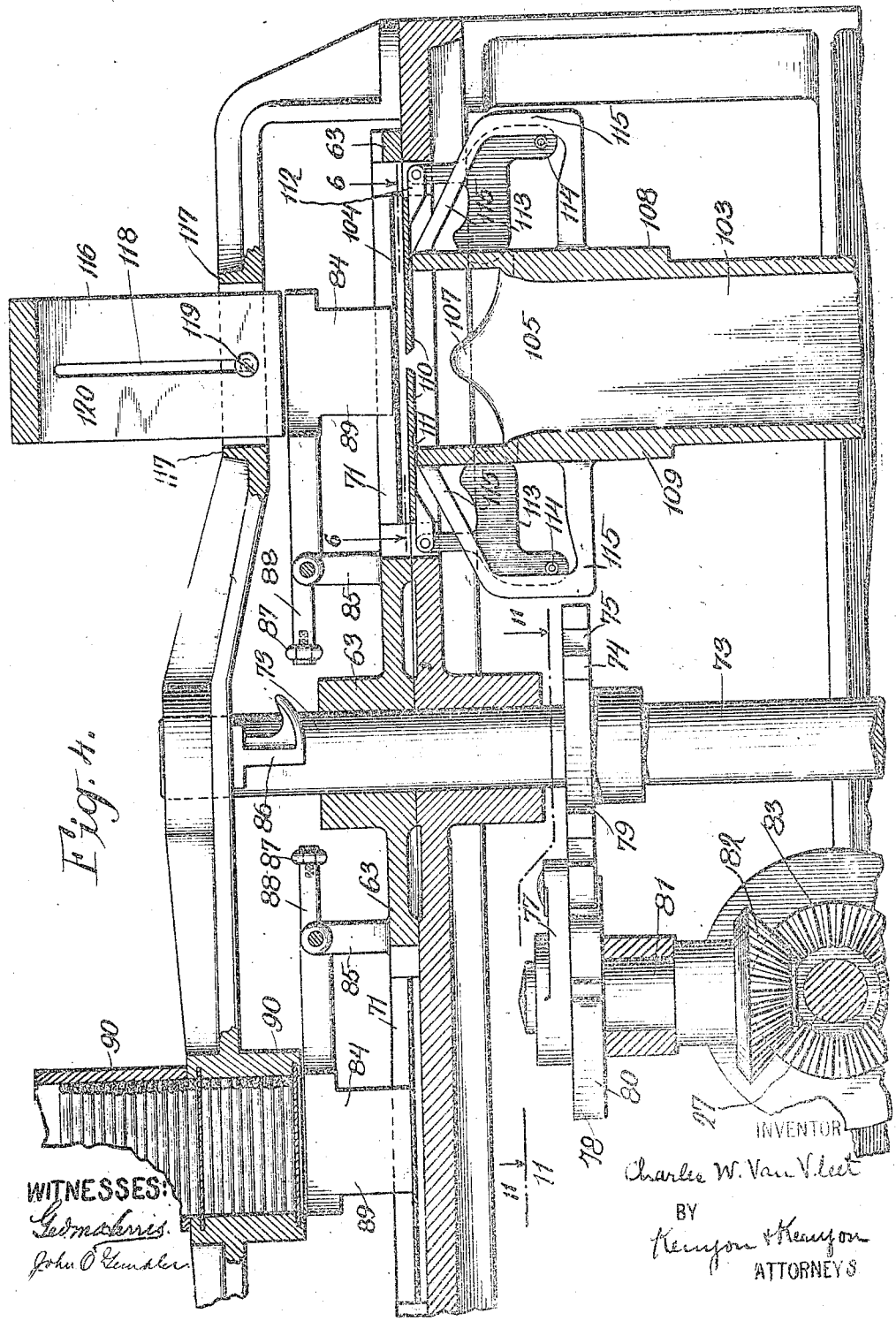

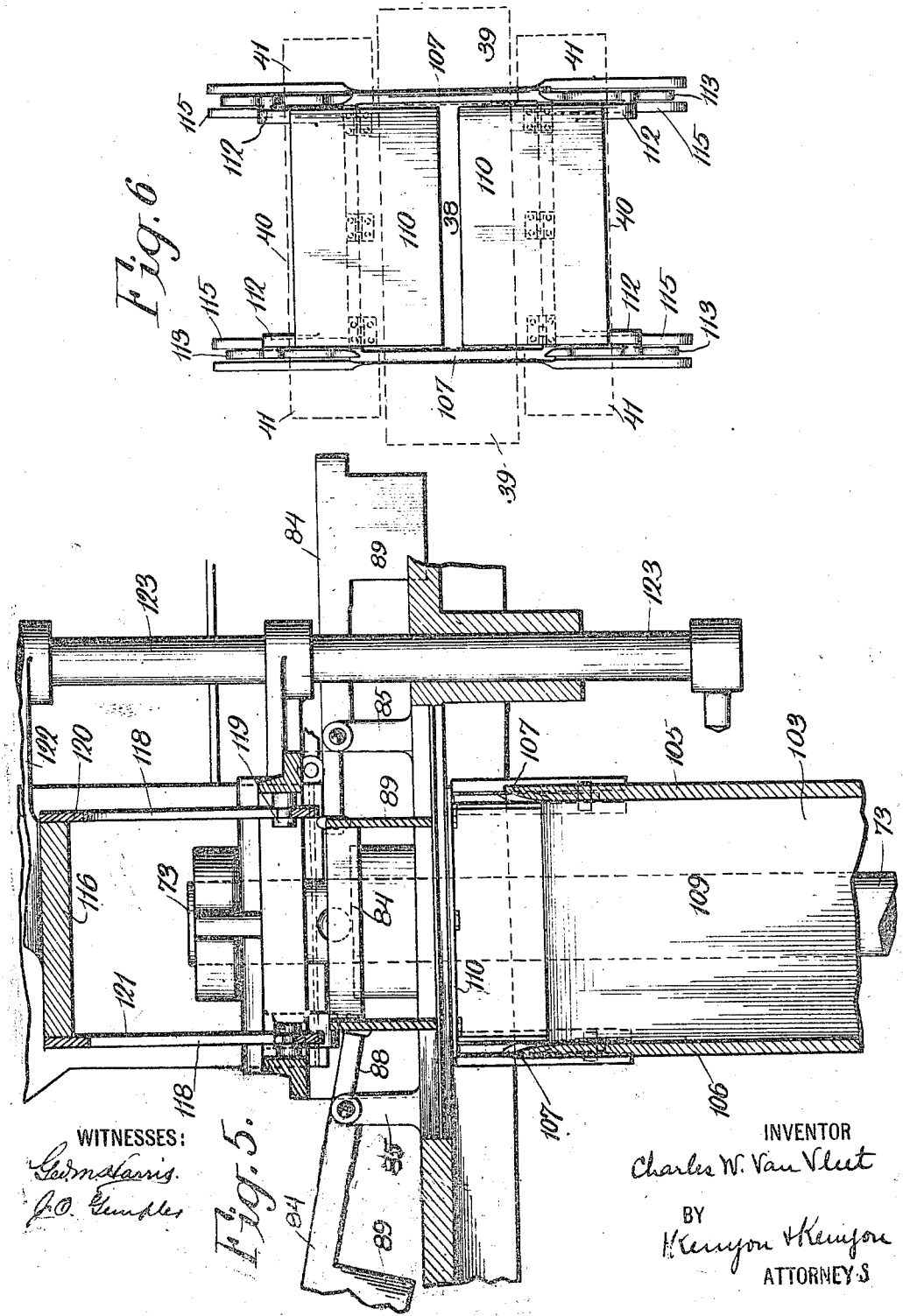

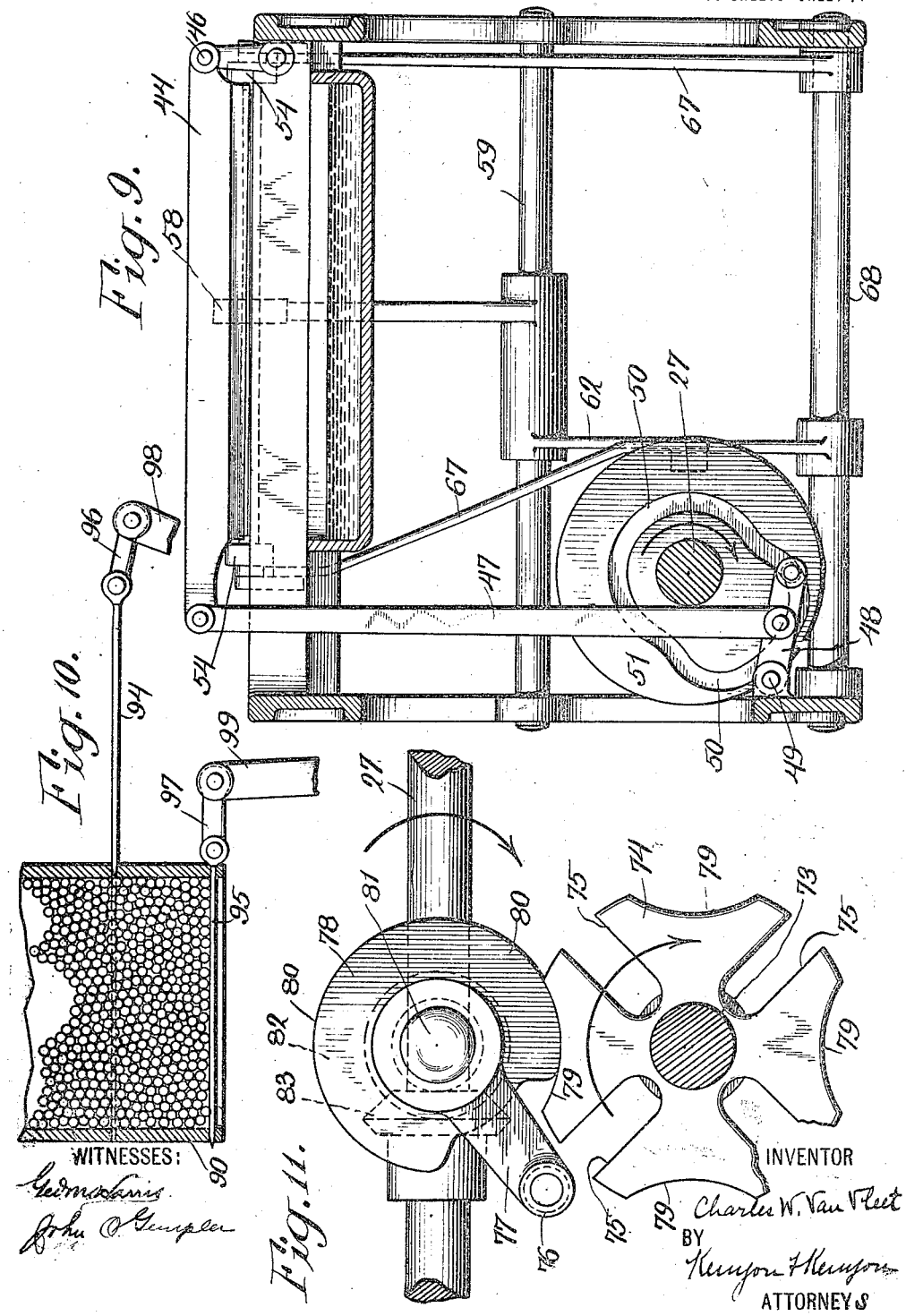

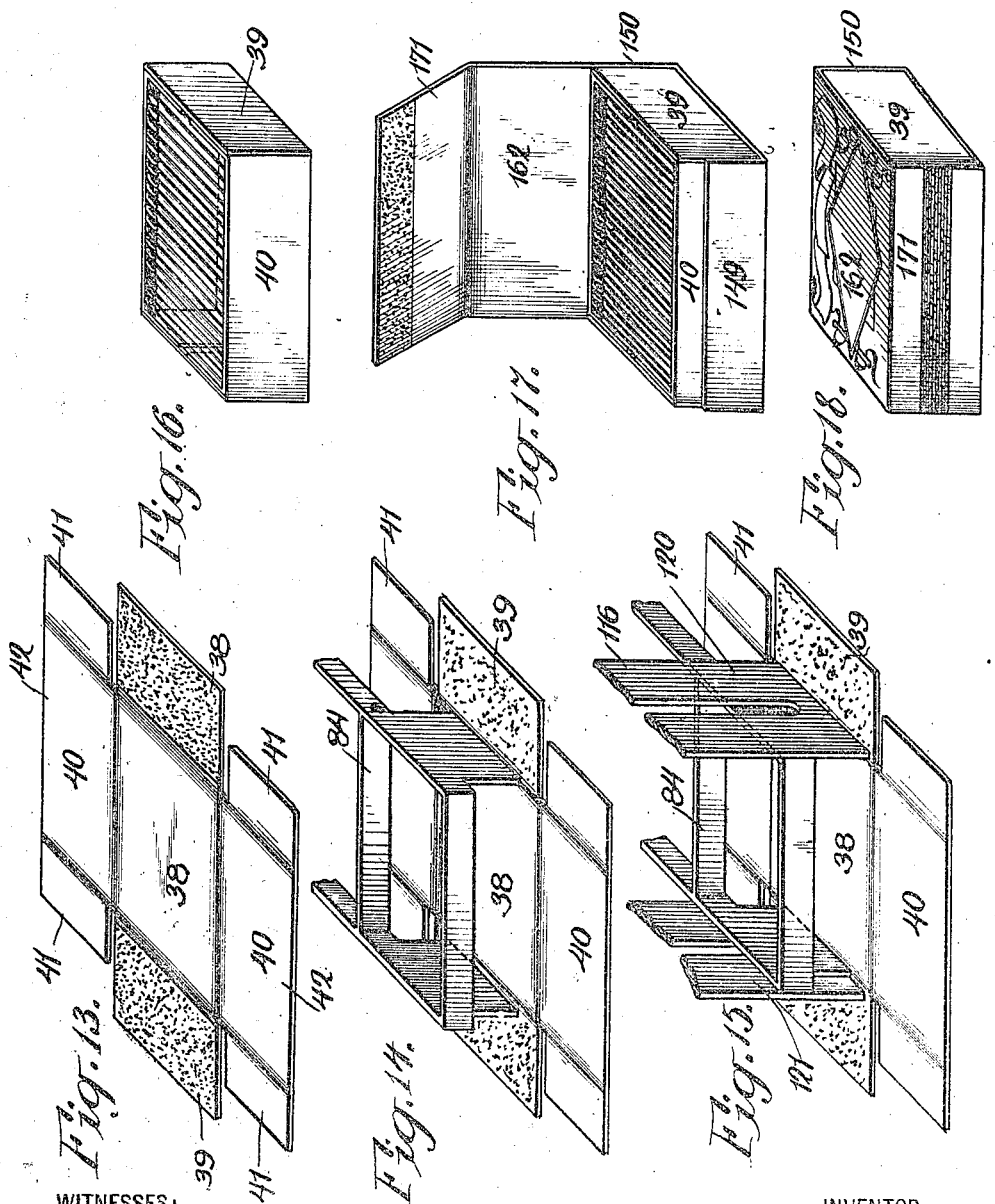

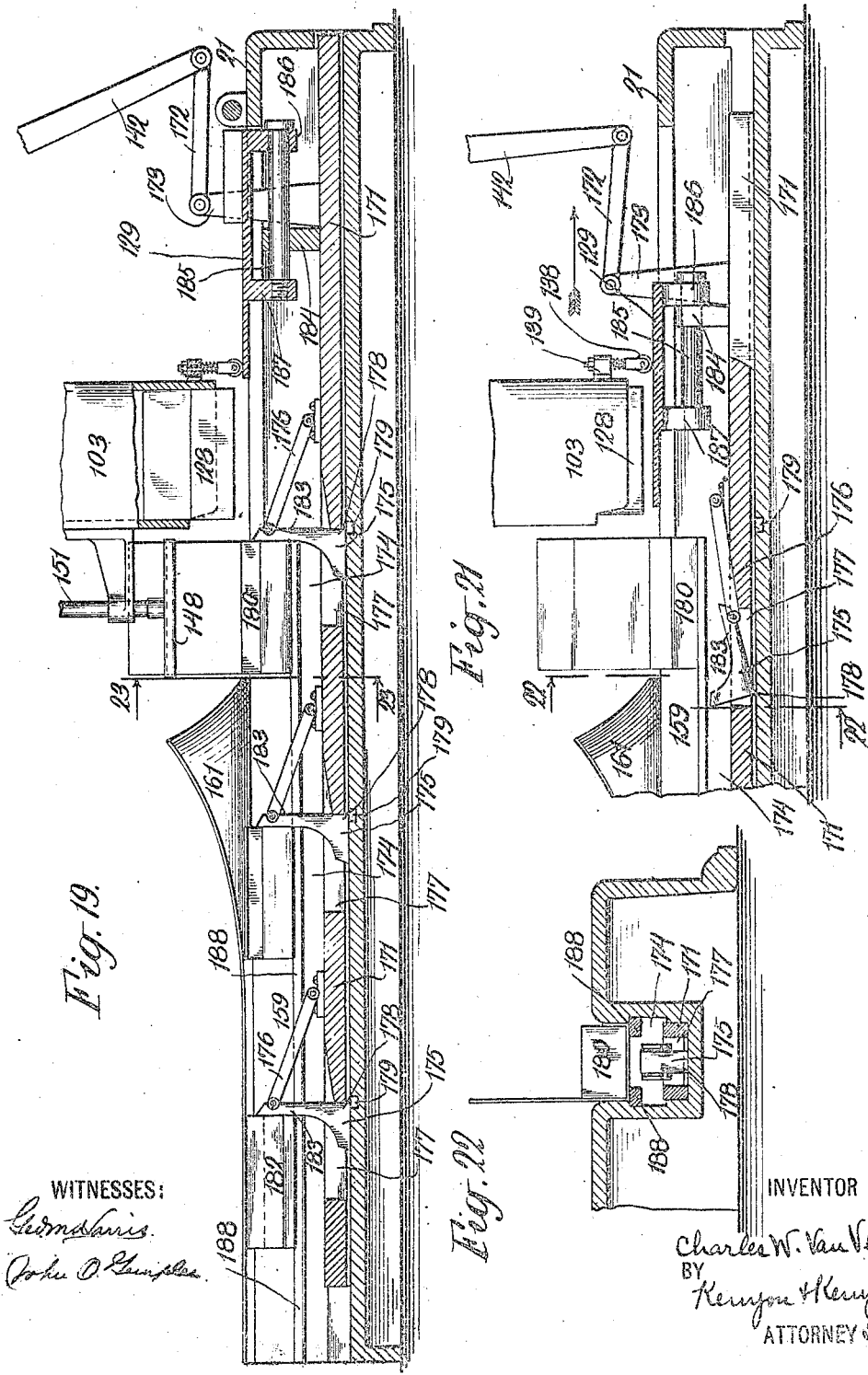

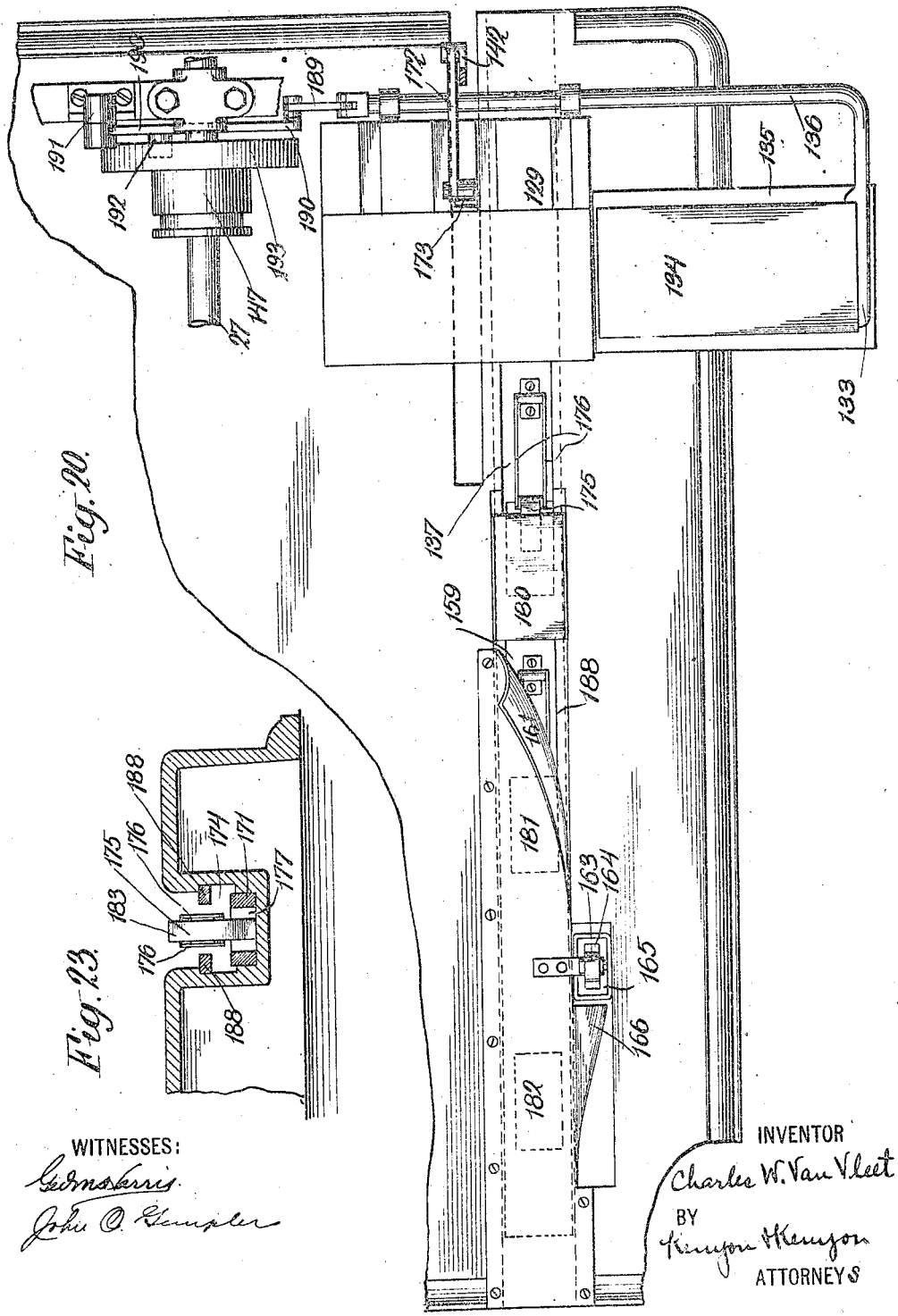

UNITED STATES PATENT OFFICE.

CHARLES W. VAN VLEET, OF SAUGERTIES, NEW YORK, ASSIGNOR, BY DIRECT AND MESNE ASSIGNMENTS, OF ONE-EIGHTH TO HENRY S. HOWLAND, OF MONTCLAIR, NEW JERSEY, AND THREE-EIGHTHS TO JAMES T. MAXWELL, OF SAUGERTIES, NEW YORK.

MATCH-BOXING MACHINE.

1,165,349.  Specification of Letters Patent.  Patented Dec. 21, 1915.

Application filed October 21, 1908.  Serial No. 458,772.

*To all whom it may concern:*

Be it known that I, CHARLES W. VAN VLEET, a citizen of the United States and a resident of Saugerties, Ulster county, and State of New York, have invented certain new and useful Improvements in Match-Boxing Machines, of which the following is a specification.

My invention relates to improvements in match-boxing and similar machines and has for its objects in general, the provision of a machine which will produce boxes from rough blanks and which will fill the boxes at the same time with matches or other material.

Further objects are the provision of arrangements which are conducive to economy and efficiency of operation and construction, and also arrangements in which a chute is provided to more effectively form the boxes and a machine in which all crushing and misshaping of the boxes is obviated as the boxes are about to leave the machine.

Further objects, advantages and features will more clearly appear from the detailed description given below taken in connection with the accompanying drawings which form a part of this specification.

In the drawings Figure 1 represents a plan view of my improved machine, certain parts being taken in section on the line 1—1 of Fig. 3. Fig. 2 is a side elevation thereof, certain parts being broken away and certain parts being shown in section taken on the line 2 of Fig. 7. Fig. 3 is a longitudinal section taken on the line 3—3 of Fig. 1. Fig. 4 is a vertical section taken on the line 4—4 of Fig. 1. Fig. 5 is an enlarged vertical section taken on the line 5—5 of Fig. 1. Fig. 6 is a plan view of the forming chute taken on the line 6—6 of Fig. 4. Fig. 7 is a plan view of the exit guideway which forms the covers about the boxes, and adjacent mechanism. Fig. 8 is a detail view taken on the line 8—8 of Fig. 2. Fig. 9 is a vertical section taken on the line 9—9 of Fig. 3. Fig. 10 is a detailed view of the hopper for the matches. Fig. 11 is a detailed view taken on the line 11—11 of Fig. 4. Fig. 12 is a detail plan view of the hopper and the carrier which delivers matches thereto. Figs. 13, 14, 15, 16, 17 and 18 are detail views showing various steps in the manufacture of the match box. Fig. 19 is a vertical sectional detail view of the exit guideway for forming the covers about the boxes, showing a modified arrangement. Fig. 20 is a plan view of parts shown in Fig. 19. Fig. 21 is a detail view of parts shown in Fig. 19 but showing them at a different stage in the operation of the machine. Fig. 22 is a section taken on the line 22—22 of Fig. 21 and Fig. 23 is a section taken on the line 23—23 of Fig. 19, certain parts being omitted.

Referring to Figs. 1, 2 and 3, 20 represents a framework to which various of the parts are secured, and which is secured upon a base 21.

Journaled at the front end of the machine are two feeding rolls 22 and 23. Pinions 24 operatively connect the rolls 22 and 23 and the pinion 24 on the roll 23 is driven by the pinion 25 also suitably journaled in the framework of the machine. Pinion 25 is periodically driven by a mutilated pinion 26, which in turn is driven from the rotating shaft 27 by means of the beveled pinion 28 secured to said shaft and beveled pinion 29 secured to the pinion 26. The shaft 27 is driven from any suitable prime mover by a belt 30. A loose pulley 31 is provided on the shaft 27 and also a belt shifting device 32 so that the machine may be stopped or started at will. Just back of the feed rolls 22 and 23 are the paste applying rolls 33 and 34. The lower roll 34 dips into the paste trough 35 and takes up paste 36 and applies it to the box blank as it passes between the rolls. The rolls 33 and 34 are operatively connected together by means of pinions 37, the pinion 37 on the roll 34 being driven by the pinion 25 which receives its periodic motion from the shaft 27 as above described.

The box blanks are stamped and cut from pasteboard or other suitable material before they enter the machine herein described. This may be done by any suitable apparatus well known in the art. The blanks, as they come to the machine herein described are in the shape shown in Fig. 13, and the various parts of the box blanks may be indicated as follows: 38 represents the bottom, 39 the ends, 40 the sides and 41 the side ends. When fed to the machine herein described the blanks are connected to one another along the edges, that is, the blanks are cut from a strip of suitable material but are not cut along the lines 42, but the blanks are thus left attached to one another and are separated after they enter the machine. The feeding rolls 22 and 23 periodically feed the strip of connected box blanks to the paste applying rolls 33 and 34. The roll 34 applies paste to the ends 39, (see Fig. 13) and this roll is recessed as at 43 so that the paste will only be applied to the ends 39 and not to the other parts of the box blank. From the paste applying rolls the box blanks are fed beneath the reciprocating cutter or knife 44 operating in conjunction with the bed portion 45. The cutter 44 is arranged to sever the various blanks of the strip along the lines 42 so that each blank will be entirely separated after it leaves the knife. The knife or cutter 44 is pivoted at one of its ends as at 46, (see Fig. 9) and at the other end is reciprocated by a link 47. The link 47 receives its motion from a lever 48 pivoted to the frame at 49 at one of its ends, and at its other end carrying a roller which operates in a cam track 50 on a cam 51. The cam 51 is secured to and rotated by the main driving shaft 27 in the direction indicated by the arrow, (Fig. 9). After being cut from the box blank just in front of it the blank just behind the knife 44, lies upon the support 52. The support 52 is journaled at its rear end or side by means of the shaft 53 to which it is rigidly secured. The shaft 53 is journaled in bearings 54, (Figs. 1 and 9) and the support 52 has guide flanges 55 on three of its sides. The box blank is arranged to lie between these flanges. After the cutting off of the blank the support 52 is given an oscillating movement on the shaft 53 which throws the box blank over on to the bed portion 56, (Fig. 1) so that the side of the blank to which the paste is applied will be uppermost. In order to produce this oscillating throw of the support 52, there is secured to the shaft 53 a pinion 57 which engages a curved rack 58, journaled on a shaft 59. The rack 58 is given an oscillating movement by means of a cam 60 having a cam track 61 which engages a roller on the arm 62 which is rigidly connected with the rack 58. The cam 60 is secured to and driven by the main shaft 27 so that at the proper time the support 52 is oscillated and the blank thrown over on the bed portion 56 with the paste side up. From the bed portion 56 the box blank is pushed rearwardly on to a rotatable table 63. This action is accomplished by two pushers 64 which move in guideways 65 and which are notched in their rear ends to engage the front edges of the box blanks. The pushers 64 are periodically operated by means of links 66 and levers 67. Both levers 67 are rigidly secured to and journaled with the shaft 68 and one of the levers 67 is bent as shown in Fig. 9 and carries a roller which is operated by a cam track 69 on the cam 70, (see Figs. 2 and 3). The pushers 64 push the blank directly over an aperture 71 in the table 63, and the blank drops into this aperture but is prevented from falling through by means of the flanges or ledges 72. The table is provided with four such apertures 71 equidistantly spaced about the center of the table. The table 63 is adapted to be given an intermittent rotative movement to bring each of the apertures 71 successively in line with the pushers 64 so that a blank may be placed in them. The table 63 is secured to a shaft 73 passing through its center. Upon the shaft 73 is secured one member 74 of an intermittent motion device like the Geneva stop, (see also Figs. 1 and 4). The member 74 is provided with slots 75 adapted to be engaged by a roller 76 on an arm 77 on the constantly rotating member 78. When the arm 77 with its roller 76 is not moving the member 74 and table 63 the latter are held locked in position by curved surfaces 79 and 80 on the members 74 and 78 respectively. The member 78 is constantly rotated by means of a shaft 81 having secured thereto a beveled gear 82 meshing with a beveled gear 83 on the main driving shaft 27.

Carried upon the intermittently rotatable table 63 are a plurality of holders or guides 84 for the matches. The holders 84 are frames in the form of bottomless boxes and are pivotally mounted upon posts 85 on opposite sides of the shaft 73, as clearly shown in Figs. 1, 2, 3 and 4. When the holders 84 are brought around in line with and immediately behind the bed piece 56 the holders are lifted by means of a cam 86 which engages a roller 87 on the arm 88 on said holders. The holders are thus lifted as clearly shown in Figs. 2 and 3 so that there will be ample room for the box blank to be shoved thereunder by the pushers 64. The holders 84 are arranged directly over two of the apertures 71 and are provided with side guides 89 for properly holding the matches in position. As the table 63 is oscillated the holder 84 which has just had a box blank placed thereunder drops down upon the box blank and the two are oscillated until they come directly beneath the match hopper 90.

The matches are fed to the hopper 90 from any convenient source along a trough 91 by means of an endless belt 92 which carries paddles 93 arranged to push the matches along the trough until they fall into the hopper 90, (see Figs. 2, 3 and 12).

The matches are measured out in sufficient quantities for each box by means of two reciprocating blades 94 and 95, (see also Fig. 13

10). The blades 94 and 95 pass through slots in the hopper 90 and prevent the matches from leaving the hopper except at predetermined intervals. These blades may be made narrow in order that they will not come into contact with the ignition material on the ends of the matches. These blades are reciprocated by links 96 and 97 pivoted thereto, which links are in turn reciprocated by levers 98 and 99. The levers 98 and 99 are journaled upon a shaft 100, (Figs. 2 and 3) and carry rollers which travel in the cam track 101 on the cam 102. The cam 102 is secured to the main shaft 27 and the cam track 101 is designed to alternately reciprocate the blades 94 and 95, so that at all times one of the blades is in position to restrain the body of the matches in the hopper. When the holder 84 and a blank is placed below the hopper 90, however, the blade 95 is withdrawn from the hopper thus permitting the matches below the blade 94 to drop into the holder 84 which properly holds them in position with respect to the box blank. Then the blade 95 closes the bottom of the hopper and the blade 94 is withdrawn to measure out another box full of matches, and the process is repeated. The next movement of the rotatable table 63 carries the holder with its matches to the position occupied by the holder 84 at the right hand of Fig. 1. No particular operation is had at this point, however. Upon the next movement of the rotatable table 63 the holder 84 with the matches in it and the box blank are carried around another ninety degrees and stopped directly over the forming chute 103, (Figs. 2 and 4). In Fig. 4 the parts are shown in this position with a box blank 104 in place, but the holder 84 is shown empty for the sake of clearness. Figs. 5 and 6 also show details of the forming chute 103 and appurtenant mechanism. The arrangement of the blank as it lies directly over said chute is clearly shown in Fig. 6.

The forming chute 103 has two opposite sides 105 and 106, each of which has a tapered flaring end portion 107. These upper end portions 107 are adapted to engage the ends 39 of the blank and bend them up perpendicularly as the blank is forced down the chute. The remaining opposing sides of the chute 103, namely sides 108 and 109, have hinged at their top inner edges, forming plates or members 110. As the blank 104 is forced down the chute the members 110 swing on the hinges 111 and the outer portions of said members force the sides 40 of the box blank up into a perpendicular position. Connected to the outer portions of the plates 110 are brackets 112 which have pivoted thereto the swinging members 113. The lower end of each member 113 carries a roller 114, (Fig. 4) which is guided in its movement by a cam 115. The cams 115 are secured to the chute 103 in the form of brackets. The inner ends of the members 113 are arranged to bend the side ends 41 of the box blank into position.

Directly above the former or forming chute 103 is a reciprocating member 116. The member or plunger 116 is guided in the framework at 117 and is provided with slots 118 having screws 119 passed therethrough into the framework to further aid in guiding the same in its movement. The plunger 116 is box-shaped but has its bottom and two of its sides cut away leaving the two sides 120 and 121, the lower edges of which are arranged to descend and engage the box blank. The plunger 116 is reciprocated by means of an arm 122 having a reciprocating rod 123 attached thereto. The lower end of rod 123 carries a pin 124 which engages with a lever 125, (see Figs. 2, 5 and 8). The lever 125 is pivoted at 126 and its other end carries a roller which engages a cam track on the cam 127, (see Fig. 2). The cam 127 is secured to the main shaft 27 and operates through the above mentioned mechanism to reciprocate the plunger 116 and cause it to be forced down the forming chute 103. Fig. 14 shows the relative positions of the box blank and holder 84 before the plunger 116 descends, the matches being eliminated for the sake of clearness. Fig. 15 shows the same parts after the plunger 116 has descended far enough to come into contact with the box blank. Further downward movement of the plunger 116 causes its sides 120 and 121 to force the blank down the chute 103. The pivoted side members 110 oscillate about the hinges 111 and cause the sides 40 of the blank to be bent upwardly to the proper position. Then the ends 39 of the blank strike the flared sides 105, 107 and are gradually bent upwardly to their proper perpendicular position. When this latter operation is well under way and before the ends 39 have been bent up very far, the cams 115 cause the members 113 in their upward movement to be forced inwardly, to force the side ends 41 of the blank, into position ahead of the ends 39. Further movement of the box down the chute 103 brings all the sides, ends and side ends thereof into proper vertical position and the paste on the ends 39 dries and securely holds the various parts in place. When the next box of matches is brought to the chute, and is forced down the same, the first box is forced still farther down the chute. This process continues until the box of matches reaches the lower end of the chute when it will be in the form shown by Fig. 16, and in the position shown by numeral 128 in Fig. 2.

Referring to Figs. 2, 7 and 8, 129 represents a pusher slide recessed at its front portion as shown in Fig. 2. The slide has a depending projection 131 moving in a guide slot 132 in the base of the machine. Referring especially to Fig. 7, 133 represents a feeding pusher which is adapted to push a cover blank, shown as 134, from the support 135 over onto the recessed portion of the pusher slide 129. The pusher 133 is driven in any suitable well known manner from the main shaft 27 by means of a rod 136. If desired the cover blanks 134 may be fed into the machine in the same manner that the box blanks are fed into the front end of the machine, or in any other suitable manner. After the cover blank has been deposited upon the recessed portion of the slide 129 the slide 129 is moved forward carrying the cover blank beneath the lowest box in the chute 103, said box being resiliently held between the lower sides 108 and 109 of said chute. The raised portion of the slide 129 aids in forcing the blank, (shown in Fig. 2 as 130) in this direction. When the blank 130 has reached a position directly under the box 128 the raised portion of the slide 129 engages the box 128 and forces it and the cover blank 130 still farther forward until they lie directly over the recess 137 in the base 21 of the machine. During the first part of the forward movement of the slide 129 the blank 130 is creased at the proper bending places by creasing wheels 138, resiliently held down upon the blank by the frame 139 and springs 140, (Figs. 2 and 8). The raised portion of the slide 129 is cut away as clearly shown in Fig. 8 to permit the movement thereof by said wheels. The slide 129 is reciprocated by means of a link 141 pivotally connected thereto which in turn is reciprocated by a lever 142 pivoted at 143, (Fig. 2). The lever 142 is oscillated by a two armed lever 144, one of the arms of which carries a pin engaging a slot 145 in the lever 142, and the other arm of which carries a pin engaging a cam track 146 in the cam 147, which is secured to the main shaft 27. When the box of matches or other material and the cover blank have reached the position directly above the recess 137 a plunger 148 descends forcing the box and cover into the recess 137 and thereby bending the sides 149 and 150 of the cover blank into position much as shown in Fig. 17.

The plunger 148 is forced downward and raised by a rod 151 which has connected thereto a link 152 operated by a lever 153 pivoted at 154. The lever 153 is oscillated by means of a roller 155 at one end thereof which engages a cam track 156 on the cam 157 driven by the main shaft 27, (see Figs. 2 and 8). After the box of matches and the cover blank have reached the bottom of the recess 137, the plunger 158 moves forward and forces the same into the forming guideway 159. One reciprocation carries the box into the position represented by 160, (Fig. 2). When the next box and cover are pushed forward into the guideway 159 it, in turn, pushes the box 160 still farther forward. The upper part or top of the forming guideway 159 is flared away as at 161. As the boxes and cover blanks pass this flared portion the tops 162 of the cover blanks are forced down onto the top of the boxes into the proper position. On their further movement through the forming guideway paste is applied to the flap 171 of the cover blank, (see also Fig. 17) by means of paste applying rolls 163 and 164, the lower roll, 164, of which dips into a paste receptacle 165 arranged at the side of said forming guideway, (see also Fig. 7). After leaving the paste applying rolls, the flared flange 166, (Fig. 7) bends the flap 171 down upon the side of the box cover 149 thus completing the finished article. The boxes of matches with their covers are pushed along the guideway 159 for some distance farther in order to give the paste on the cover opportunity to adhere firmly and then the finished boxes are ejected at the end of said guideway at 167.

Referring to Fig. 2, the plunger 158 is reciprocated by the depending leg 131 on the slide 129. The leg 131 is arranged to engage either of two stops 168 and 169 in its reciprocating movement. These stops 168 and 169 are secured to a rod 170 which is secured to the plunger 158 to drive the same. The lost motion between the stops 168 and 169 is to allow for the difference in the length of the movements of the slide 129 and plunger 158. Fig. 18 shows the completed box of matches.

Referring to Figs. 19, 20 and 21, I show a modified and improved arrangement for forming the cover blanks about the boxes of matches. Instead of connecting the reciprocating arm 142 to the slide 129 by link 141, I connect it to the slide 171 by a link 172 and post 173. The slide 171 reciprocates in a recess 174 below the forming guideway 159. The slide is adapted to operate and has loosely connected to it shoes 175 which are loosely pivoted on one of the ends of links 176, the links 176 being pivoted at their other ends to the slide 171. The slide 171 is provided with recesses or apertures 177 to accommodate the shoes 175. When the slide is moving in the direction indicated by the arrow, (Fig. 21) the shoes 175 take a nearly horizontal position as shown in Figs. 21 and 22. The slide is moved in this direction until the heels 178 of the shoes 175 engage the notches or recesses 179 in the base of the machine and then the slide is moved in the opposite direction. This last movement causes the shoes 175 to rotate about the heels 178 as pivots until they assume the vertical positions shown in Figs. 19 and 23. The notches 179 are so arranged that these positions are obtained just behind the match boxes which in these figures are indicated by the reference numerals 180, 181 and 182. Further movement of the slide 171 causes the legs 183 of the shoes 175 to push the box 180 into the position of the box 181, and the box 181 into the position of the box 182 and so on. On the return movement of the slide 171 the shoes 175 drop into the substantially horizontal position shown in Fig. 21 so that they pass beneath the respective boxes. The operation is repeated, each shoe 175, pushing a new and different box a certain distance through the forming guideway 159, at each stroke. By this means each box is pushed independently of the others and the liability of crushing any one of the boxes due the resistance afforded by the boxes in front of it, is substantially eliminated. The slide 171 also carries a projection 184 which loosely embraces a rod 185 carried by projections 186 and 187 depending from the slide 129. The projection 184 is designed to engage the projections 186 and 187 during the proper portions of its reciprocations to move and operate the slide 129 as described with reference to other figures.

In Figs. 19, 20 and 21 the top of the forming guideway 159 is also flared away as at 161 and the flare 166 is provided to properly fold the cover blanks about the boxes as they pass through the guideway. Also paste applying apparatus 163, 164 and 165 is provided to properly apply paste to the cover blanks as previously described, (Fig. 20). In this modification the forming guideway 159 is provided at its bottom with tracks 188 upon which the match boxes rest and travel on their movement therethrough.

In Fig. 20, I show one method of operating the feeding means for the cover blanks. Supposing the cover blank 134 to reach the support or table 135 in any suitable manner as above described, the feeding pusher 133 pushes the blank 134 over onto the recessed portion of the slide 129 at the proper time. The rod 136 connected with the pusher 133 is operated by a link 189 pivotally connected thereto at one end and at its other end pivotally connected to one end of a lever 190 which is pivotally connected to the framework at 191. The lever 190 carries a pin 192 which operates in a cam track on the cam 193 secured to the main driving shaft 27.

From the above it will be apparent that I have provided a machine which will quickly and effectively carry out the objects and do the work for which it was designed, a machine which is not likely to get out of order, and a machine which is efficient and economical in construction and operation.

Although I have described certain embodiments of my invention with great detail with relation to the boxing of matches or other material, I do not desire to be limited to such details, but—

Having clearly set forth and described my improvements what I claim and desire to secure by Letters Patent, is:

1. In a machine of the class described, a rotatable table for rotating the box blanks to be formed, means for feeding box blanks thereto, a holder for the matches or similar material pivoted to said table to hold the material on the blanks while the table is rotated, cams for raising said holder, means for feeding matches or similar material to said holder and means for forming the box about the material.

2. In a machine of the class described, means for feeding box blanks thereto, means for feeding to the blanks matches or similar material consisting of separate integral and comparatively rigid pieces of which a plurality are to be put into each box, a bottomless holder for maintaining the matches, etc., in place on the blank, and means for folding the blanks about the material, said last mentioned means embracing reciprocating blades passing down the outside of said holder.

3. In a machine of the class described, means for feeding box blanks thereto, means for feeding to the blanks matches or similar material consisting of separate integral and comparatively rigid pieces, of which a plurality are to be put into each box, a bottomless holder for maintaining the matches, etc., in place on the box blanks, and means for folding the blanks about the material and means for folding a cover about the box of material.

4. In a machine of the class described, a rotatable table, means for feeding box blanks thereto, means for feeding to the blanks matches or similar material consisting of separate integral and comparatively rigid pieces, of which a plurality are to be put into each box, a bottomless holder carried by the table for maintaining the matches, etc., in position on the box blanks, and means for folding the blanks about the material; said last mentioned means embracing reciprocating blades passing down the outside of the holder and engaging the blanks.

5. In a machine of the class described, a rotatable table, means for feeding box blanks thereto, a bottomless holder pivoted on said table to hold the material on the table, while it is rotated and the box is formed thereabout, means for feeding material to said holder, and means for folding the sides of the blank to form the box about said material.

6. In a machine of the class described, a rotatable table, means for feeding box blanks thereto before the blanks are folded, a bottomless holder carried by said table to hold the material on the blanks while the table is rotated, means for feeding material to said holder and means for then forcing the blank through the table and folding the sides of the blank about the material to form the box.

7. In a machine of the class described, a rotatable table, means for feeding box blanks thereto, a bottomless holder carried by said table to hold the material on the table while it is rotated, means for feeding material to said holder, means for causing said holder to be raised and lowered with respect to the table to permit the blanks to be inserted beneath the holder, and means for folding the sides of the blank to form the box about said material.

8. In a machine of the class described, a rotatable table, means for feeding box blanks thereto, a bottomless holder on said table, means for feeding material to said holder, means for causing said holder to be raised and lowered, and means for folding the sides of the blank to form the box about said material, said folding means embracing a forming chute and reciprocating means passing about the outside of said bottomless holder to force the blank and material into the chute to fold the blank about the material, means for intermittently rotating said table and means for forming cover blanks about the boxes and material.

9. In a machine of the class described, a rotatable table for rotating the material and box blanks to be formed about the material, a bottomless holder over said table for holding the material in position on the table while it is rotating, means for feeding box blanks between said holder and table, means for feeding material to said blanks, a former below said table and a reciprocating plunger for forcing the blanks and material through the table and into one end of the former to fold the sides of the blank about the material to form the box and means for forcing the folded blank and material out of the other end of the former.

10. In a machine of the class described, a rotatable table, a bottomless holder over said table, means for feeding box blanks between said holder and table, means for feeding material to said blanks, a former and a reciprocating plunger having two blades passing down outside of said holder for forcing the blanks and material into the former to fold the sides of the blank about the material to form the box, and means for feeding and folding cover blanks about the boxes of material.

11. In a machine of the class described, an intermittently rotating table, means for feeding blanks thereto, means for feeding material to the blanks after the table has partially rotated, a bottomless holder for maintaining the material in place on said blanks, a former including means for forcing the sides of the blanks in position, means for forcing the side ends of the blanks in position and means for forcing the ends of the blanks in position, and means for forcing the blanks and material out of the former, embracing reciprocating blades passing down outside of the former.

12. In a machine of the class described, means for intermittently carrying and depositing matches upon box blanks before the blanks are formed, a forming chute for box blanks, said chute being provided with pivoted members for forming the sides of the blanks in position, pivoted members for forcing the ends of the blanks into position forcing the side ends of the blanks into position and rigid members for forcing the ends of the blanks into position and means for forcing the blanks through said chute to form the blanks about the matches.

13. In a machine of the class described means for intermittently carrying and depositing matches upon box blanks before the blanks are formed, a forming chute for box blanks, said chute being provided with pivoted members for forming the sides of the blanks in position, pivoted members for forcing the side ends of the blanks into position and flared rigid members for forcing the ends of the blanks into position, said second mentioned members being pivoted to said first mentioned pivoted members and means for forcing the blanks through said chute to form the blanks about the matches.

14. In a machine of the class described, a forming chute for box blanks, said chute being provided with pivoted members for forming the sides of the blanks in position, pivoted members for forcing the side ends of the blanks into position and rigid members for forcing the ends of the blanks into position, said second mentioned members being pivoted to said first mentioned pivoted members and rigid cams engaging said second mentioned pivoted members to cause their operation.

15. In a machine of the class described, means for intermittently carrying and depositing matches upon box blanks before the blanks are formed, the combination of a forming chute for the box blanks, said chute being provided with movable members for folding the sides of the blanks in position, and other movable members for folding the side ends of the blanks in position, said last mentioned members being pivoted to said first mentioned members and tapered and flared rigid members for forcing the ends of the blanks into position and means for forcing the blanks through said chute to form the blanks about the matches.

16. In a machine of the class described, the combination of a forming chute for the box blanks, a bottomless holder for holding the material over said chute, two plates pivoted one on either side of the chute and arranged to normally lie in a substantially horizontal position by gravity, means for feeding material and blanks to said holder, and a plunger for forcing the material and blanks into the chute and causing said plates to move about their pivots to partially fold the box.

17. In a machine of the class described, means for feeding box blanks, a bottomless holder arranged over the blanks, means for feeding material to the holder, a former and a reciprocating bottomless plunger arranged to force the blanks and material from said holder into the former, said plunger having two side members passing outside of said holder.

18. In a machine of the class described, means for feeding box blanks, a bottomless holder arranged over the blanks, means for feeding material to the holder, a former and a member and means for folding the blanks into boxes, said member having two side members passing outside of said holder.

19. In a machine of the class described, means for feeding blanks into the machine, a cutter, means for feeding matches to the blanks, a bottomless holder for holding the matches in position on the blanks, means for raising said holder to permit a blank to be placed therebeneath, a former, means for forcing the blanks and matches through the former to box the matches, means for feeding cover blanks to the boxes, means for folding the cover blanks about the boxes and means for applying paste to both sets of blanks.

20. In a machine of the class described, means for feeding box blanks to the machine, paste applying rolls the upper surfaces of which apply paste to the under side of said blanks, means for depositing matches or similar material on top of said blanks, means for holding the matches in position on said blanks, a forming chute for said blanks, means for forcing said blanks down into said chute to fold the blanks and whereby the matches fall by gravity within the box as it is being formed, means for applying cover blanks to said box and a paste applying roll the upper surface of which applies paste to the under surface of the cover blanks.

21. In a machine of the class described, means for feeding blanks to the machine, means for feeding matches or similar material to the blanks, a box shaped bottomless holder for maintaining the material in position on the blanks, a former and reciprocating means for forcing the blanks into the former to form the boxes about the material.

22. In a machine of the class described, the combination of a rotating table, means for feeding box blanks to the table, means for feeding matches or similar material to the blanks on the table, a holder for holding the matches in position on the blanks while the table is rotating, and independent means for folding the blanks about the matches to box them.

23. In a machine of the class described, means for feeding box blanks to the machine, a hopper for matches or similar material, a holder for holding the material in position on the blanks before the blanks are folded, means for giving said holder an intermittent rotary motion, and means for folding the blanks about the material.

24. In a machine of the class described, means for feeding box blanks to the machine, a hopper for the matches, an endless carrier belt on which the matches are adapted to rest by gravity, for conveying the matches to the hopper, said carrier belt having partitions for properly positioning the matches, and means for forming the blanks about the matches to box the same and a rectangular bottomless holder adapted to receive the matches from said hopper and convey them to the forming means.

25. In a machine of the class described, means for feeding box blanks thereto, a holder for holding the matches or other material in position on the blanks, a hopper for the material and a plurality of reciprocating blades for dividing the matches or other material in the hopper into groups, said blades having beveled and pointed end portions.

26. In a machine of the class described, a hopper for the matches or similar material, a reciprocating blade passing completely through the hopper for cutting off the supply of material and a second reciprocating blade below the first for regulating the supply of material, a rotating table below the hopper and a bottomless box on the table for receiving the material from the hopper.

27. In a machine of the class described, a hopper for the matches or similar material, a reciprocating blade passing completely through the hopper for cutting off the supply of material and a second reciprocating blade below the first for regulating the supply of material, said blades having their front ends pointed and beveled.

28. In a machine of the class described, a hopper for the matches or similar material, a reciprocating blade passing completely through the hopper for cutting off the supply of material and a second reciprocating blade below the first for regulating the supply of material, said blades having their front ends pointed.

29. In a machine of the class described, a hopper for the matches or similar material, two reciprocating blades for measurably regulating the supply of material from said hopper, said blades passing into the hopper among the material, a reciprocating plunger, a bottomless box for receiving the material from the hopper, and means for moving the box from beneath the hopper to beneath the plunger.

30. In a machine of the class described, a vertical former for the box blanks, a bottomless holder above the blanks holding the material in position on the blanks, and a relatively movable plunger for forcing the blanks into the former to form the boxes, said plunger having two of its sides and bottom cut away and two sides extending down outside of said bottomless holder to engage the blank and force it into the former to fold the blanks about the material.

31. In a machine of the class described, a forming chute, a hopper for the matches or similar material, a bottomless holder, means for moving said holder under the hopper to be filled and then over said forming chute, means for feeding a box blank under said box before it is filled, and two vertically reciprocating blades adapted to push the blank into the former to form it into a box and allow the matches to fall with the box by gravity.

32. In a machine of the class described, a forming chute, a bottomless holder, means for moving said holder to be filled, and then over said forming chute, means for feeding a box blank under said box before it is filled, and two vertically reciprocating blades adapted to push the blank into the former to form it into a box and allow the matches to fall with the box by gravity.

33. In a machine of the class described, a forming chute, a rotatable table, a bottomless holder pivotally mounted on said table, means for moving said holder to be filled, and then over said forming chute, means for feeding a box blank under said box before it is filled, and two vertically reciprocating blades adapted to push the blank into the former to form it into a box and allow the matches to fall with the box by gravity.

34. In a machine of the class described, means for applying cover blanks to the boxes, a former provided with means rigidly secured thereto or stationary with respect thereto for completely folding the cover about the box, and a plurality of pivotally mounted intermittently reciprocated members each arranged to engage one box and blank at a time to move them through the former.

35. In a machine of the class described, means for applying cover blanks to the boxes, a former provided with means rigidly secured thereto or stationary with respect thereto for completely folding the cover about the box, and a plurality of pivotally mounted intermittently reciprocated members each arranged to engage separate boxes and blanks to move them through the former during one movement and arranged to pass about said boxes during the reverse movement thereof.

36. In a machine of the class described, means for feeding matches or similar material thereto, a rotating table for carrying the material and box blanks, means for folding the blanks about the material to box the same, means for feeding cover blanks to the boxes, creasing rollers for creasing the cover blanks during this feeding movement, means for forming the cover blanks about the boxes and a roller for applying paste to the cover blanks.

37. In a machine of the class described, a holder for matches or similar material, means for intermittently rotating said holder, and means for feeding material to said holder, means for feeding box blanks beneath said holder, a former for the box blanks, and a reciprocating member passing down the outside of the holder and forcing the blanks and material into the former.

38. In a machine of the class described, a hopper for the matches or similar material, a holder therefor in the form of a bottomless box, means for moving said holder under said hopper so that the holder may be filled with material from the hopper, a former and means causing the material to move down out of the bottom of the bottomless box and into the former.

39. In a machine of the class described, a hopper for the matches or similar material, means for measuring the matches or similar material means for feeding box blanks, a holder for transferring the matches from the measuring means to the blanks, a former for forming boxes from the blanks about the matches and a belt carrying partitions for carrying the matches to the hopper.

40. In a machine of the class described, a forming chute, a hopper for the matches or similar material, means for dividing the material in the hopper into groups, a rotatable table, a plurality of bottomless boxes carried by said table, means whereby each group of material is deposited in separate boxes, means for feeding box blanks under the boxes before they have been filled, and two vertically reciprocating blades adapted to push the blank into the former to form it into a box and allow the matches to fall with the box by gravity.

41. In a machine of the class described, the combination of feeding means for the box blanks, a former for placing the matches or other material in proper relation to the blanks, a hopper for the matches or other material, a plurality of reciprocating blades for dividing the matches or other material in said hopper into groups, said blades having beveled end portions and being one above the other, and means for forming the blanks about the matches or other material.

42. The combination of means for feeding box material, means for cutting said material into box blanks, means for applying paste thereto, a rotary carrier, means for placing the box blanks upon said carrier, a hopper for matches or other material, a frame for holding the matches or other material in proper relation with the box blanks, a guiding chute provided with means for forming the box blanks, means for forcing the boxes through said chute, means for applying cover blanks to said boxes, means for forming the cover blanks about the sides of the boxes, means for applying paste to the cover blanks, a guideway having means for forming the cover blanks over the boxes and a plurality of reciprocating means for moving the boxes through said guideway.

43. In a machine of the class described, means for feeding blanks thereto, means for depositing material upon said blanks, a suitable forming chute, means for forcing the blanks and material into said chute, said chute being provided with pivotally mounted plates at one end thereof for folding the sides of the blank, and with flared portions at said end for folding the ends of the blank, members pivotally mounted to said first mentioned pivotally mounted members for folding the side ends of the blank, and cams for regulating the operation of said last mentioned members.

44. In a machine of the class described, means for feeding blanks thereto, means for depositing material upon said blanks, a suitable forming chute, means for forcing the blanks and material into said chute, said chute being provided with pivotally mounted plates at one end thereof for folding the sides of the blank, and with flared portions at said end for folding the ends of the blank, members pivotally mounted to said first mentioned pivotally mounted members for folding the side ends of the blank, cams for regulating the operation of said last mentioned members, means for removing the blank and material from said chute, means for applying the cover blank to the package and means for forming said cover blank about the package.

45. In a machine of the class described, a forming chute provided with two pivotally mounted members for forcing the sides of the blank into position, said chute being provided with flaring portions for forcing the ends of the blank into position, and members pivotally mounted to said first mentioned pivotally mounted members for forcing the side ends of the blank into position.

46. In a machine of the class described, a forming chute provided with two pivotally mounted members for forcing the sides of the blank into position, said chute being provided with flaring portions for forcing the ends of the blank into position, and members pivotally mounted to said first mentioned pivotally mounted members for forcing the side ends of the blank into position, and cams for producing the proper operation of said last mentioned members.

47. In a machine of the class described, the combination of means for forming the cover blanks about the boxes, a guideway, notches in said guideway, a plurality of members for engaging the boxes to move them along said guideway, said members being arranged to engage said notches, a reciprocating slide loosely connecting, and pivoted links for each of said members with said slide.

48. In a machine of the class described, means for feeding in matches, means for feeding in box blanks, a forming chute, a rotatable table for carrying the matches and unfolded box blanks to the chute, a bottomless holder for holding the matches on the blanks during such movement and over the chute, and a plunger for forcing the blanks down the chute to form the blanks about the matches.

49. In a machine of the class described, a forming chute, means for carrying the matches and unfolded box blanks to the chute, a bottomless holder for holding the matches on the blanks during such movement and over the chute, and a plunger for forcing the blanks down the chute to form the blanks about the matches, said plunger having sides which pass down by the bottomless holder on the outside thereof.

In testimony whereof, I have signed my name to this specification, in the presence of two subscribing witnesses.

CHARLES W. VAN VLEET.

Witnesses:
GORHAM CROSBY,
EDWIN SEGER.